US010369447B2

(12) United States Patent
Hackett

(10) Patent No.: US 10,369,447 B2
(45) Date of Patent: *Aug. 6, 2019

(54) GOLF TRAINING SYSTEM

(71) Applicant: Joseph Hackett, Goldsboro, NC (US)

(72) Inventor: Joseph Hackett, Goldsboro, NC (US)

( * ) Notice: Subject to any disclaimer, the term of this patent is extended or adjusted under 35 U.S.C. 154(b) by 37 days.

This patent is subject to a terminal disclaimer.

(21) Appl. No.: 15/802,014

(22) Filed: Nov. 2, 2017

(65) Prior Publication Data

US 2018/0345109 A1 Dec. 6, 2018

Related U.S. Application Data

(63) Continuation-in-part of application No. 15/612,336, filed on Jun. 2, 2017, now Pat. No. 9,914,019.

(51) Int. Cl.

| A63B 69/36 | (2006.01) |
|---|---|
| A63B 24/00 | (2006.01) |
| A63B 71/06 | (2006.01) |
| A63B 71/02 | (2006.01) |
| G09B 19/00 | (2006.01) |
| A63B 71/00 | (2006.01) |

(52) U.S. Cl.
CPC .......... *A63B 69/36* (2013.01); *A63B 24/0062* (2013.01); *A63B 71/023* (2013.01); *A63B 71/0619* (2013.01); *A63B 71/0622* (2013.01); *G09B 19/0038* (2013.01); *A63B 71/0036* (2013.01); *A63B 2071/0625* (2013.01); *A63B 2071/0655* (2013.01); *A63B 2207/02* (2013.01); *A63B 2209/00* (2013.01); *A63B 2210/50* (2013.01); *A63B 2220/805* (2013.01); *A63B 2225/093* (2013.01)

(58) Field of Classification Search
USPC .......................................... 473/220–224, 257
See application file for complete search history.

(56) References Cited

U.S. PATENT DOCUMENTS

| 2,571,974 | A | | 10/1951 | Walker | |
|---|---|---|---|---|---|
| 3,009,704 | A | * | 11/1961 | Heard | A63B 69/3614 473/151 |
| 3,776,555 | A | | 12/1973 | Hagaman | |
| 3,801,108 | A | * | 4/1974 | Murray | A63B 69/3614 473/225 |
| 4,461,477 | A | | 7/1984 | Stewart | |
| 4,732,390 | A | * | 3/1988 | McCollum | A63B 69/3623 473/264 |
| 4,903,968 | A | | 2/1990 | Hargrave | |
| 5,087,047 | A | | 2/1992 | McConnell | |
| 5,437,457 | A | | 8/1995 | Curchod | |
| 5,626,526 | A | | 5/1997 | Pao et al. | |
| 5,926,780 | A | | 7/1999 | Fox et al. | |
| 6,089,989 | A | * | 7/2000 | Sutcliffe | A63B 69/3614 473/225 |

(Continued)

FOREIGN PATENT DOCUMENTS

WO 2010117192 A2 10/2010

*Primary Examiner* — Nini F Legesse

(74) *Attorney, Agent, or Firm* — James G. Passé; Passé Intellectual Property, LLC

(57) ABSTRACT

The present invention is a golf training device which employs multiple electronic sensors for detecting both improper and proper swings. These sensors work together to improve proper swing and give immediate feedback to the golfer.

13 Claims, 3 Drawing Sheets

(56) References Cited

U.S. PATENT DOCUMENTS

| | | | |
|---|---|---|---|
| 6,261,189 B1 * | 7/2001 | Saville | A63B 24/0003 |
| | | | 473/151 |
| 6,702,690 B1 * | 3/2004 | Albright | A63B 69/3614 |
| | | | 473/219 |
| 6,821,211 B2 | 11/2004 | Otten et al. | |
| 7,431,661 B1 | 10/2008 | Cailey | |
| 7,704,153 B2 * | 4/2010 | Loh | A63B 69/3614 |
| | | | 473/148 |
| 8,715,100 B1 | 5/2014 | Petroske et al. | |
| 9,114,302 B2 | 8/2015 | Mendelsohn | |
| 9,914,019 B1 * | 3/2018 | Hackett | A63B 69/3641 |
| 2003/0054898 A1 | 3/2003 | Otten et al. | |
| 2006/0040755 A1 | 2/2006 | Choi | |
| 2011/0159980 A1 | 6/2011 | Pelz | |

* cited by examiner

GOLF TRAINING SYSTEM

This application is a continuation-in-part of U.S. non-provisional application Ser. No. 15/612,336 filed on Jun. 2, 2017, and which is incorporated herein in its entirety by reference.

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to a golf training device. In particular, it relates to a golf training device which does not physically touch the golfer and mostly or completely does not touch the golf equipment.

Description of Related Art

The game of golf challenges a golfer with their skill in ball control in controlling the direction and distance the ball is hit. While it "only" involves hitting a ball with a club, it has become very clear that there are dozens of nuances in the golfers swing that control the golfer's success. It has, therefore, been the case that there are dozens of devices which have been developed to aid the golfer in perfecting the swing of the golf club. However, there are no devices developed which tell you when the swing is correct. Accordingly, there is serious need of developing products that aid the golfer developing these principals of play.

The vast majority of devices attach to the golfer or the club. While they are of some value, the golfer becomes accustomed to the device's presence, weight, and aid and frequently cannot perform without the presence of the device. Some electric eye type devices have been used to help predict trajectory or detect a two-dimensional element of the swing. However, there is currently nothing that will notify the golfer of error in 3D swing movements and let the golfer know when there has been a successful swing.

BRIEF SUMMARY OF THE INVENTION

The present invention relates to a system of at least two electronic eyes for swing error detection and, optionally, one sensor for correct swing detection such that the golfer and equipment are never physically touched by the golfer and may not be touched by the equipment. There is a critical placement of the electron eyes and an optional strike pole such that they work together as an entire system of golfer swing training.

In one embodiment, the present invention relates to a user golf training system having a three-dimensional detection system for both proper and improper swing of a golf club hitting a golf ball by the user comprising at least two of the following:

a) a first golf club ground sensor placed on a distal side of the golf ball on a reference axis of the proper direction of the golf club movement during the striking of the golf ball;

b) a second golf club ground sensor placed on a proximal side of the golf ball on a reference axis of the proper direction of the golf club movement during the striking of the golf ball;

c) a third golf club sensor placed behind the user at a reference axis that is perpendicular to the ground at a point where the golf swing of the user has gone too far behind the user; and d) a fourth club sensor placed over the head of the user at a reference axis that is parallel to the ground, perpendicular to the first sensor and second sensor axis, and at a position a properly swung golf club will cross the reference axis if the club is swung properly.

DETAILED DESCRIPTION OF THE INVENTION

Figure 1:
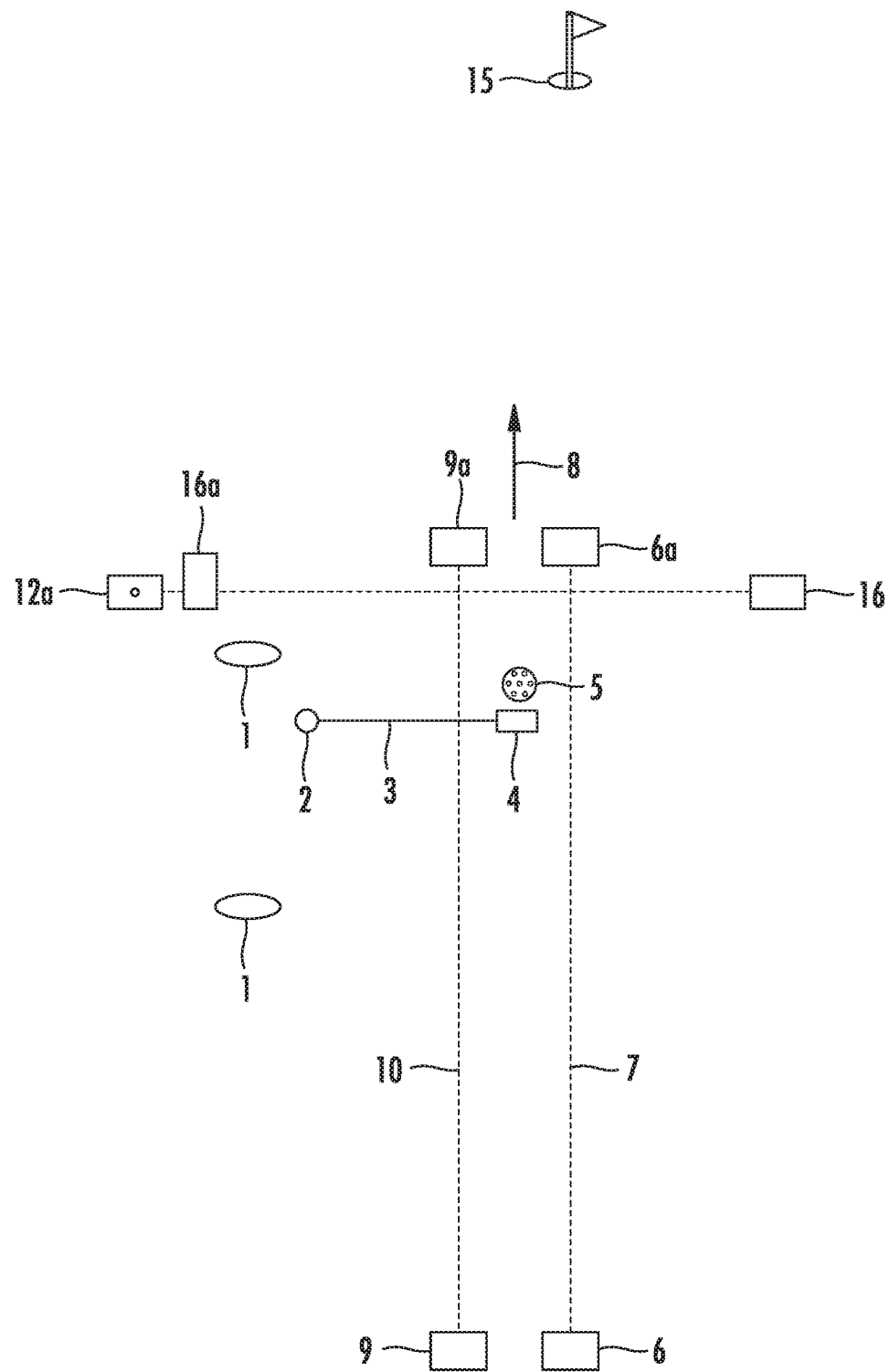
FIG. 1 is an aerial view of the system of the present invention having all four sensors with a user.

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

Definitions

The terms "about" and "essentially" mean ±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein the term "user" refers to a person using the system who is learning to improve their golf swing with a golf club.

As used herein the term "golf training system" refers to the present invention which provides an interactive three-dimensional system for giving both positive and/or negative feedback to a user about their golf swing being proper or improper during the process of striking a golf ball. The system, particularly, is a no-touch, low-touch type system where there is no physical contact by the user with the system during use of the system by a user and little or no contact with the equipment. In one embodiment, the system breaks down and fits entirely in one carrying case. In another embodiment, the system is a fixed installation.

As used herein the term "three-dimensional detection" refers to the present system not being a planar two-dimensional system. Many systems measure in the direction the ball is hit and, in fact, only measure the ball trajectory. The present system measures improper swing deviation in the measurement directions and one proper swing measurement in a direction perpendicular to one of those improper dimensions.

As used herein the term "proper and improper swing" refers to the present system using a sensor to detect when a user of the system, during the swing of the golf club, has exited the swing path of the club best designed to hit the ball, i.e. forward toward the hole. Improper swing is measured with three sensors while proper swing is measured at the apex/end of the swing.

As used herein the term "sensor" refers to any device that is a photodetector used for detecting obstruction of a light beam, in this case the golf club, either the shaft or head of which breaks the beam. In another embodiment, the sensor is a pole which, if the user is not swinging properly, the user will hit. An example is a system that uses a light transmitter and receiver. If there is any obstruction in the way that breaks the light beam, there is an alarm, such as a buzzer or light. In one embodiment, the alarm is different for each sensor such as different tones. Visible light may be used but infrared radiation conceals the operation of the device and typically is used in modern systems. The sensor can be powered by direct current or the power line alternating current frequency, but many photodetector systems use an infrared light-emitting diode modulated at a few kilohertz which allows the detector to reject stray light and improves the range, sensitivity, and security of the device. However, any such photo detector system can be used in the present system. In one embodiment, the sensors' direction can be adjusted. In another embodiment, the sensors are mounted height adjustable or position adjustable.

As used herein the term "first and second golf club ground sensor" refers to a sensor placed pointing in the direction the ball is to be struck, i.e. on a reference axis of the proper direction of the golf club movement during striking of the golf ball in order to hit it in the desired/proper direction. "Distal" refers to the side of the ball opposite where the user is standing during the use of the golf club. "Proximal" refers to the side of the ball nearest the user during the use of the golf club. The two ground sensors, first and second, are essentially parallel to each other.

As used herein the term "third sensor" refers to a sensor being placed behind the user perpendicular to the ground, i.e. a reference axis perpendicular to the ground at a point where the golf swing of a user has gone too far behind the user. In this embodiment, either the electronic eye or an upright pole can be utilized as the sensor. In a further embodiment, the pole is flexible enough that even if hit, the golfer can follow through and not be stopped by the pole. In one embodiment, a foam noodle (hollow foam tube) is attached to polymer tubing to create an upright, perpendicular to the ground pole.

As used herein the term "fourth sensor" refers to a sensor placed parallel to the ground above the head of the user and used to judge when the swing has ended in the correct position. The fourth sensor is on a reference axis that is parallel to the ground, perpendicular to the first, second, and third sensor, and at a position a properly swung golf club will cross the reference axis.

The present invention relates to using at least two of the sensors indicated but three or all four sensors are also indicated. In one embodiment, when there are only two sensors, they are the first and second sensors.

DRAWINGS

Now referring to the drawings, FIG. 1 is an aerial view of the system of the present invention with a user. In this view, the user is represented by user's feet 1 and user's hands 2 together. User is holding club 3 wherein club head 4 is positioned behind golf ball 5. First golf club ground sensor 6 is positioned near the ground from just above the ground to about where the club head 4 is at the start of the swing. It is positioned on the distal side of the ball 5. Dotted line 7 is the sensor beam which reflects off of reflector 6a and it is in line with reference axis 8.

Second golf club ground sensor 9 is placed on the proximal side of the ball 5. It is positioned near the ground from just above the ground to about where the club head 4 is at the start of the swing. Dotted line 10 is the sensor beam which reflects off of reflector 9a and is in line with reference axis 8 and parallel to sensor beam 7. If user breaks these beams, it is because user is not moving the club head 4 directly toward the hole 15 along axis 8. Reflector 12a receives the beam from third golf club sensor (shown in FIG. 2) which is behind user's feet 1 perpendicular to the ground. It is positioned such that at the top part of the user's viewing, if it is too far back, the sensor will alarm. Lastly, the system has fourth club sensor 16 placed over the head of the user on a reference axis that is parallel to the ground and perpendicular to the other three sensors' axis 8. It is bounced off of reflector 16a. This sensor will alarm if the top of the swing is properly positioned.

Figure 2:
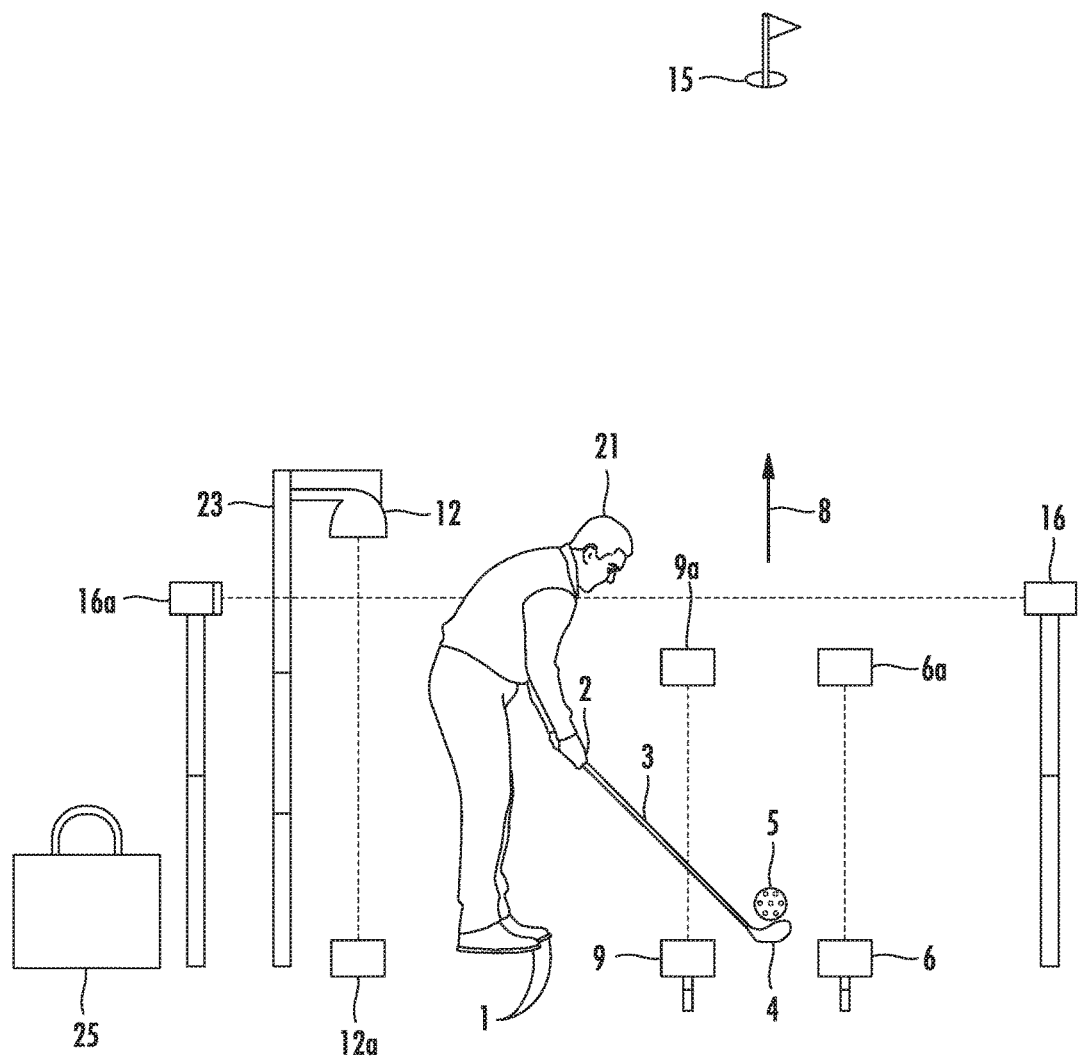
FIG. 2 is a side view of the system of the present invention having all four sensors with a user.

FIG. 2 is the same user in a side view using the system. In this view, the entire user 21 can be seen holding club 3 in their hands 2. Third golf club sensor 12 is shown mounted on adjustable height pole 23. Likewise, sensors 6, 9, and 16 are mounted on height adjustable poles. The system can be taken apart, as shown, and placed in bag 25 or mounted in a permanent manner. As noted above, while all four sensors are shown in the Figures, it is contemplated that there can be two, three, or four sensors within the scope of the present invention.

Figure 3:
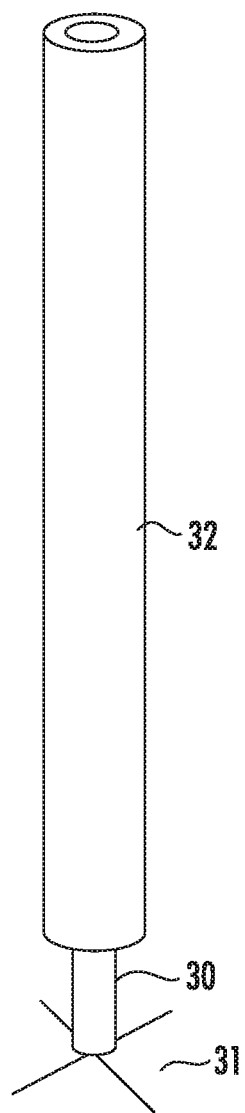
FIG. 3 is an embodiment of the third sensor which is a perpendicular pole.

FIG. 3 is an embodiment of sensor three wherein the sensor is an upright pole. In this view, a foam "noodle" or foam hollow pipe covering is mounted on an upright conduit (plastic) and if hit, the golf club will pass by the device as it wobbles out of the way. It is positioned at the same vertical line as if a laser is being utilized. In this embodiment, plastic pole 30 is mounted on stand 31. At the top end of the pole 30 (not seen), a hollow foam tube 32 covers pole 30. The tubing can extend past the top of the pole or just cover the pole.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the applicant.

What is claimed is:

1. A user golf training system having a three-dimensional detection system for both proper and improper swing of a golf club hitting a golf ball by the user comprising at least two of the following:
    a) a first golf club ground photodetector sensor placed on a distal side of the golf ball on a reference axis of a proper direction of the golf club movement during the striking of the golf ball;
    b) a second golf club ground photodetector sensor placed on a proximal side of the golf ball on a reference axis of the proper direction of the golf club movement during the striking of the golf ball;
    c) a third golf club photodetector or upright pole sensor placed behind the user at a reference axis that is perpendicular to the ground at a point where the golf swing of the user has gone too far behind the user; and
    d) a fourth club photodetector sensor placed over the head of the user at a reference axis that is parallel to the ground, perpendicular to the first sensor and second sensor axis, and at a position a properly swung golf club will cross the reference axis if the club is swung properly
    e) wherein if any of the photodetector sensors are crossed an alarm sounds.

2. The system according to claim 1 wherein one or more of the sensors are height adjustable.

3. The system according to claim 1 wherein one or more of the sensors is direction adjustable.

4. The system according to claim 1 which is designed to be portable.

5. The system according to claim 4 wherein the system breaks down into parts and is positioned in a single bag.

6. The system according to claim 1 which is fixed in place.

7. The system according to claim 1 wherein when there are only two sensors, they are the first and second photodetector sensor.

8. The system according to claim 1 wherein when there are only three sensors, consisting of the first and second photodetector sensors and the third photodetector or upright pole sensor.

9. The system according to claim 1 wherein the third sensor is an upright pole.

10. The system according to claim 9 wherein the pole is flexible.

11. The system according to claim 9 which comprises a hollow foam tube.

12. The system according to claim 1 wherein at least one of the detectors is selected from the group consisting of the third photodetector or upright pole sensor and the fourth photodetector sensor.

13. The system according to claim 1 wherein the third sensor is a photodetector sensor.

* * * * *